United States Patent [19]

Ooe et al.

[11] Patent Number: 5,157,755
[45] Date of Patent: Oct. 20, 1992

[54] HERMETICALLY COATED OPTICAL FIBER

[75] Inventors: Masaharu Ooe; Yoichi Ishiguro; Gotaro Tanaka, all of Yokohama; Nobuyuki Yoshizawa, Mito, all of Japan

[73] Assignees: Sumitomo Electric Industries, Ltd., Osaka; Nippon Telegraph and Telephone Corporation, Tokyo, both of Japan

[21] Appl. No.: 774,167

[22] Filed: Oct. 15, 1991

Related U.S. Application Data

[63] Continuation of Ser. No. 536,875, Jun. 12, 1990, abandoned.

[30] Foreign Application Priority Data

Jun. 13, 1989 [JP] Japan .................................. 1-180156

[51] Int. Cl.⁵ .............................................. G02B 6/22
[52] U.S. Cl. .................................... 385/128; 385/127; 427/163
[58] Field of Search .................. 350/96.3, 96.31, 96.33, 350/96.34; 427/163, 166; 385/123, 124, 125, 126, 127, 128

[56] References Cited

U.S. PATENT DOCUMENTS

| | | | |
|---|---|---|---|
| 4,183,621 | 1/1980 | Kao et al. | 350/96.33 X |
| 4,319,803 | 3/1982 | Burmeister | 350/96.33 |
| 4,435,040 | 3/1984 | Cohen et al. | 350/96.33 |
| 4,512,629 | 4/1985 | Hanson et al. | 350/96.3 |
| 4,838,643 | 6/1989 | Hodges et al. | 350/96.33 |
| 4,874,222 | 10/1989 | Vacha et al. | 350/96.34 |

FOREIGN PATENT DOCUMENTS

| | | |
|---|---|---|
| 0249230 | 12/1987 | European Pat. Off. . |
| 0308143 | 3/1989 | European Pat. Off. . |
| 0374926 | 6/1990 | European Pat. Off. . |
| 2156858 | 10/1985 | United Kingdom . |

OTHER PUBLICATIONS

Yoshitaka Namihira, "Optical Fiber", Patent Abstract of Japan, Apr. 25, 1989, vol. 13, No. 175 (P-863) 3523.

*Primary Examiner*—John D. Lee
*Assistant Examiner*—Stephen W. Barns
*Attorney, Agent, or Firm*—Cushman, Darby & Cushman

[57] ABSTRACT

A hermetically coated optical fiber comprising a core made of glass, a cladding made of quartz glass surrounding the core the outermost layer of which glass contains fluorine, and a carbon layer surrounding the fluorine-containing glass layer, which optical fiber has good initial strength and fatigue characteristics.

3 Claims, 2 Drawing Sheets ered with carbon suffers less deterioration of trans-
HERMETICALLY COATED OPTICAL FIBER This is a continuation of application Ser. No. 07/536,875, filed on Jun. 12, 1990 which was abandoned.

BACKGROUND OF THE INVENTION

1. Field of the Invention

The present invention relates to a hermetically coated optical fiber with improved long-term fatigue characteristics and initial strength.

2. Description of the Related Art

As shown in FIG. 1, an optical fiber generally comprises a core 1 made of glass, a cladding 2 surrounding the core 1 and a resin coating layer 3 surrounding the cladding 2. In such structure, moisture and hydrogen atoms easily pass through the resin coating layer 3 and react with glass as time passes, whereby the optical fiber tends to be broken. To improve long-term fatigue characteristics of the optical fiber, a structure of FIG. 2 is proposed. This structure has, between the cladding 2 and the resin coating layer 3, a dense layer 4 through which moisture or the hydrogen molecule hardly passes and which is made of an inorganic material such as SiC, carbon, TiC, Ti$_3$N$_4$ and Si$_3$N$_4$ or a metal such as aluminum (hereinafter referred to as "hermetic layer"), and an optical fiber having the hermetic layer is called a hermetically coated optical fiber.

Among the hermetically coated optical fibers, one coated with carbon suffers less deterioration of transmission characteristics and has better fatigue characteristics (cf. U.S. Pat. No. 4,319,803).

However, the conventional hermetically optical fibers have relatively weak initial strength.

SUMMARY OF THE INVENTION

One object of the present invention is to provide a hermetically coated optical fiber having improved initial strength.

Another object of the present invention is to provide a method for producing an hermetically coated optical fiber having improved initial strength.

According to a first aspect of the present invention, there is provided a hermetically coated optical fiber which comprises a core made of glass, a cladding made of quartz glass surrounding the core the outermost layer of which glass contains fluorine, and a carbon layer surrounding the fluorine-containing glass layer.

According to a second aspect of the present invention, there is provided a method for producing the hermetically coated optical fiber of the present invention, wherein tension applied to the optical fiber during production is not larger than 20 MPa.

Preferably, the core is made of pure quartz, and the hermetic carbon coating is formed from a raw material comprising at least one unsaturated hydrocarbon.

DETAILED DESCRIPTION OF THE DRAWINGS

The present invention will be described by making reference to the accompanying drawings.

Figure 3A:
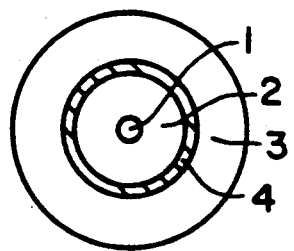
FIGS. 3A and 3B are cross sections of two embodiments of the hermetically coated optical fiber of the present invention, and FIG. 4 schematically shows an apparatus for producing the hermetically coated optical fiber according to the present invention.
Figure 3B:
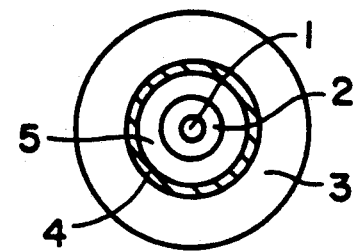

FIG. 3A is a cross section of one embodiment of the hermetically coated optical fiber, which comprises a glass core 1, a cladding 2 made of quartz glass doped with fluorine (F-doped SiO$_2$), a resin coating layer 3 and a hermetic coating 4 made of carbon. This embodiment has only one cladding 2. Alternatively, as shown in FIG. 3B, the optical fiber cf the present invention additionally has a second cladding 5. In the embodiment, the cladding 5 is doped with fluorine, while the cladding 2 may be or may not be doped with fluorine. When the cladding 2 is not doped, the core is doped with an additive which increases the refractive index of the core glass.

The carbon hermetic layer 4 is preferably formed by a chemical vapor deposition of a hydrocarbon. Examples of the hydrocarbon are saturated hydrocarbons (e.g. methane, ethane, propane, etc.), unsaturated hydrocarbons (e.g. ethylene, propylene, acetylene, etc.), aromatic hydrocarbons (e.g. benzene, etc.) and their derivatives, particularly halogenated derivatives (e.g. carbon tetrachloride, chloroform, trichloroethylene, dichloroethylene, etc.) as well as mixtures of the hydrocarbons and their halogenated derivatives. Among them, the unsaturated hydrocarbons such as ethylene and acetylene are preferred. Also the aromatic hydrocarbons such as benzene are preferred.

Conditions for vapor depositing carbon are substantially the same as in the conventional method.

Figure 4:
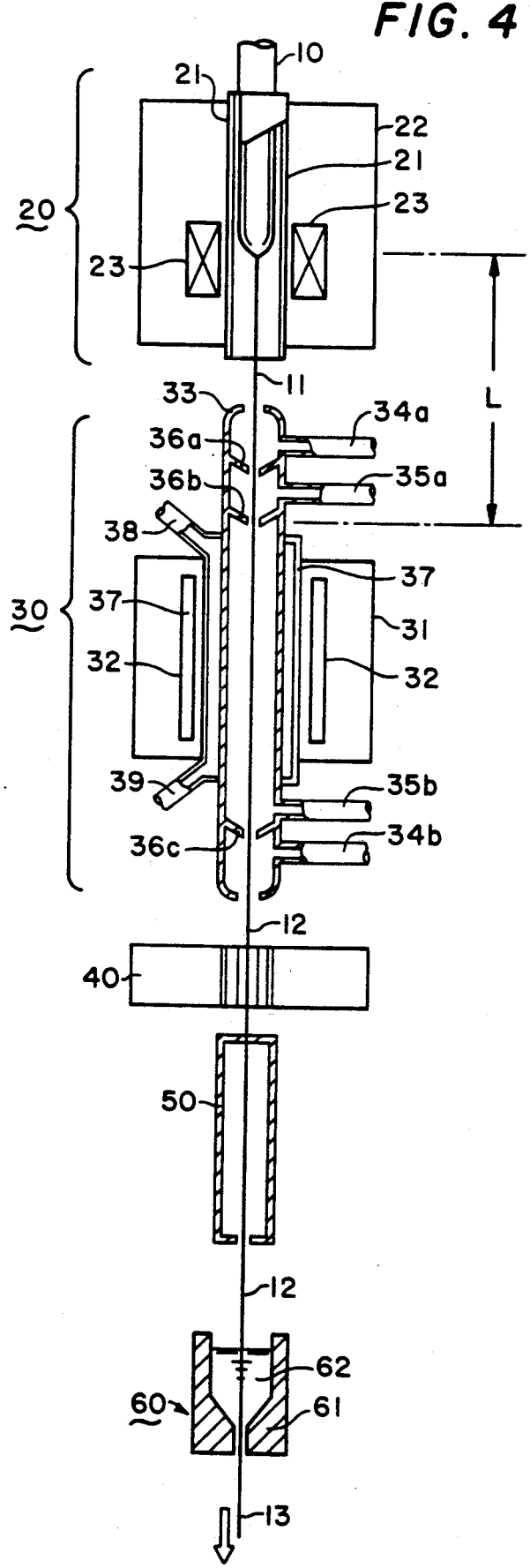

One method for the production of the hermetically coated optical fiber will be explained with reference to an apparatus of FIG. 4. With a drawing device 20, a bare glass fiber 11 is drawn from a preform 10 comprising a core and a cladding at least the outermost layer of which is doped with fluorine and introduced in a carbon coating device 30 with which a carbon coating is formed on the surface of optical fiber 11 to produce a carbon-coated optical fiber 12. Then, the carbon-coated optical fiber 12 passes through a device 40 for measuring a fiber diameter, a cooling device 50 and a resin coating device 60 to produce a resin-coated optical fiber 13. The resin-coated optical fiber 13 is directly wound on a drum (not shown) through a capstan, or further jacketed with a resin coating such as Nylon and then wound on a drum.

The method of the present invention will be illustrated further in detail.

The preform 10 is suspended in a muffle tube 21 from an arm (not shown). The muffle tube 21 is installed in a fiber drawing furnace 22 which has a heater 23 for heating and melting a lower end portion of the preform 10. As the fiber drawing heater, any of known heaters such as an electric heater and a high-frequency heater can be used. Among the heaters, one which does not liberate the hydrogen molecules and/or dusts is preferred. With the drawing device 20, the bare optical fiber 11 having substantially the same refractive index profile as that of the preform 10 can be produced and then introduced in the carbon coating device 30.

The carbon coating device 30 comprises a reaction furnace 31, a reaction tube 33 which is inserted in the furnace 31 and a cooling jacket 37 installed between the reaction furnace 31 and the reaction tube 37. The reaction furnace 31 has an IR lamp 32 heat of which is concentrated to heat the bare optical fiber 11 and an atmosphere surrounding the optical fiber 11. With such concentrated heating, undesirable decomposition reactions other than on the surface of the bare optical fiber 11 are prevented during coating the fiber with pyrolytic carbon. The reaction tube 33 has branch tubes 34a and 35a at the upper portion thereof and branch tubes 34b and 35b at the lower portion thereof. A sealing gas such as nitrogen gas is supplied through the branch tubes 34b and 35b and exhausted through the branch tubes 34a and 35a. At three positions on the inner wall of the reaction tube 33, three baffle plates with slits 36a, 36b and 36c are provided, respectively so that the interior atmosphere is effectively isolated from the ambient atmosphere. The plates are downwardly shaped so that the optical fiber is easily passed therethrough downwardly.

Figure 1:
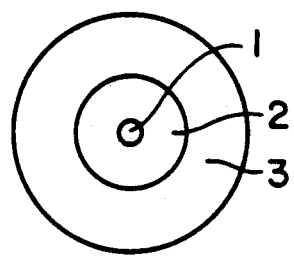
FIG. 1 is a cross section of a conventional optical fiber comprising a core, a cladding and a resin coating layer.
Figure 2:
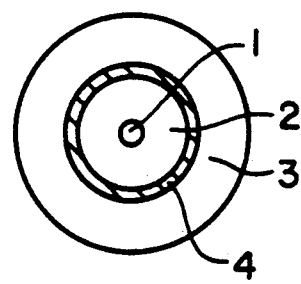
FIG. 2 is a cross section of a conventional hermetically coated optical fiber.

The cooling jacket 37 which is installed between the reaction tube 33 and the reaction furnace 31 has a branch tube 38 at its upper end and a branch tube 39 at its lower end. Through the branch tubes 38 and 39, the cooling medium such as helium or nitrogen gas is flowed through the jacket. Since the reaction tube 33 is cooled from outside with the cooling jacket during carbon coating, not only excessive decomposition reaction is prevented but also the inner surface of the reaction tube 33 is not clouded with the decomposed products. In FIG. 2, "L" stands for a distance from a neckdown par of the preform 10 to the reaction tube interior containing the raw material.

The carbon coating has generally a thickness of 200 to 1000 Å, preferably 300 to 600 Å.

With the device 40 for measuring the fiber diameter which is provided just beneath the carbon-coating device 30, an outer diameter of the carbon-coated optical fiber 12 is measured by means of laser light. With using the measured diameter of the optical fiber, the operation conditions are adjusted to keep the diameter of the bare optical fiber 11 at a predetermined value.

With the cooling device 50 which is positioned beneath the diameter measuring device 40, the carbon-coated optical fiber 12 is cooled to, for example, 70° C. or lower. The cooling device 40 consists of, for example, a cylinder of 30 cm in length and 1.5 cm in inner diameter and through its interior, a cooling gas such as helium is flowed at, for example 10 liters per minute.

Beneath the cooling device 50, the resin coating device 60 is installed. The device 60 comprises a die 61 which is filled with a resin melt. While the carbon-coated optical fiber 12 is passed through the die 61, it is coated with the resin to form the resin-coated optical fiber 13.

If excessive tension is applied to the optical fiber and the carbon film is formed on the stretched optical fiber, the carbon film tends to be broken when the tension is removed from the optical fiber. Therefore, the tension to be applied to the optical fiber during production should not exceed a certain limit. According to the experiments carried out by the present inventors, it has been found that the tension applied to the optical fiber should not exceed 20 MPa.

The tension applied to the optical fiber can be easily controlled, for example, by adjusting the winding speed of the optical fiber or by adjusting the drawing temperature.

In general, on the surface of quartz glass, hydroxyl (OH) groups tend to be present and bond with silicon atoms of the glass. When the carbon film is to be formed on such glass surface, carbon atoms may bond to the surface through the weak hydrogen bond but cannot be bond to the surface through the strong covalent bond. Therefore, the carbon film is partly broken or peeled off and microcrystals in the film damage the optical fiber glass, which reduces the strength of the optical fiber.

In the present invention, since the outermost layer of the cladding contains fluorine, it may be assumed that the silicon atoms of the glass and the carbon atoms would directly bond each other through the covalent bond at higher probability. Thereby, the produced optical fiber has improved strength. That is, on the outermost layer of the F-doped $SiO_2$ cladding, a large number of F-Si- bonds may be present and react with the carbon-containing raw material so that the possibility of formation of strong C-Si bonds could be increased.

For example, when the hydrocarbon is used as the raw material, the hydrogen and carbon atoms may react with the silicon atom as follows:

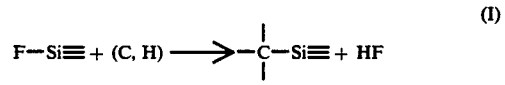
(I)

When the unsaturated hydrocarbon is used as the raw material, the reaction may proceed as follows:

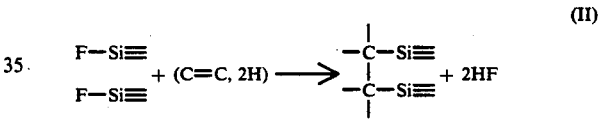
(II)

whereby a more stable bond is formed and the C-Si bond becomes stronger. Therefore, the unsaturated hydrocarbons such as ethylene and acetylene are particularly preferred for forming the carbon coating according to the present invention. From the aromatic hydrocarbon such as benzene, the carbon film having similar properties to those of the carbon film made from the unsaturated hydrocarbon can be formed.

In the optical fiber which is hermetically coated with carbon, the hydrogen molecules do not migrate so that the reliability of the optical fiber is greatly increased.

With the optical fiber comprising a core made of pure quartz ($SiO_2$), if the carbon film is broken and the hydrogen molecules penetrate into the core, the optical fiber is not influenced by the hydrogen molecules except the inherent light absorption of the hydrogen molecules. Further, the optical fiber comprising the core made of pure quartz has better radiation resistance.

PREFERRED EMBODIMENTS OF THE INVENTION

The present invention will be illustrated by following Examples.

EXAMPLE 1

During drawing of an optical fiber having an outer diameter of 125 μm and comprising a cladding made of a glass of a composition shown in Table 1, a carbon film with a thickness of 500 Å was coated on the peripheral surface from a carbon-containing raw material shown in Table 1 by the CVD method.

Among the raw materials, CH₄ and C₂H₂ were introduced as such to the reaction chamber since they are in the gas state at room temperature, and CCl₄ and C₆H₆ were introduced to the reaction chamber with a helium carrier gas by bubbling the carrier gas in them since they are in the liquid state at room temperature.

The thickness of the carbon film was measured through Auger electron spectroscopy. Over the carbon film, a silicone resin was coated to produce a hermetically coated optical fiber having an outer diameter of 400 μm (Nos. 1 through 6). Then, the properties of each optical fiber were measured. The results are shown in Table 1.

The uncoated optical fiber was a single mode optical fiber fabricated by the VAD method and had a core diameter of 10 μm and a cladding diameter of 125 μm, and the applied tension was 15 MPa during drawing and coating.

To achieve the difference of the refractive index between the core and the cladding, a combination of a core glass of SiO₂ and a cladding glass of F-doped SiO₂ (F content: 1% by weight), or a combination of a core glass of GeO₂-doped SiO₂ (GeO₂ content: 5% by weight) and a cladding glass of SiO₂ was used. It was confirmed that, when no carbon film was present, the optical fiber comprising the SiO₂ core and one comprising the GeO₂-doped SiO₂ core had substantially the same properties with respect to the measured properties.

The properties were measured as follows:

Adhesivity of carbon film

A commercially available adhesive tape is wound around the optical fiber and peeled off. Then, a ratio of the peeled off area to the area which is covered by the adhesive tape is calculated and evaluated according to the following criteria:
A: Very good (the ratio being zero)
B: Good (the ratio being less than 0.1)
C: Poor (the ratio being from 0.1 to 0.5)
D: Bad (the ratio being larger than 0.5)

Initial tensile strength

One end of the optical fiber is fixed and the other end is pulled with measuring a load applied to the optical fiber, and the load at break is measured. The larger value means better strength.

Dynamic fatigue parameter

At pulling rates $v_1$ and $v_2$, the tensile test is carried out and tensile strength $T_1$ and $T_2$ are obtained. The dynamic fatigue parameter is defined by n which is calculated from the following equation:

$$\frac{1}{n+1} = \frac{\log T_2 - \log T_1}{\log v_2 - \log v_1}$$

The larger n means small fatigue of the glass, namely stress corrosion.

TABLE 1

| | | | Properties | | |
|---|---|---|---|---|---|
| Fiber No. | Cladding glass | C-raw material | Initial strength (kg) | Adhesivity of carbon film | Dynamic fatigue parameter |
| 1 | F—SiO₂ | C₂H₂ | 5.0 | A | >50 |
| 2 | SiO₂ | ↑ | 4.6 | B | >50 |
| 3 | F—SiO₂ | CCl₄ | 3.8 | D | 20 |
| 4 | SiO₂ | ↑ | 4.0 | D | 20 |
| 5 | F—SiO₂ | C₆H₆ | 4.8 | A | >50 |
| 6 | F—SiO₂ | CH₄ | 4.8 | B | >50 |
| 7 | F—SiO₂ | C₂H₄ | 5.2 | A | >50 |

As understood from the results of Table 1, the optical fibers comprising the cladding made of F-doped SiO₂ glass and having the carbon film synthesized from the hydrocarbon (Nos. 1, 5 and 7) had better dynamic fatigue parameters, adhesivity of the carbon film and initial strength.

EXAMPLE 2

Around a single mode optical fiber having a core diameter of 5 μm and a cladding diameter of 125 μm which was fabricated by the VAD method from the combination of glasses shown in Table 2 which achieved the refractive index difference of 0.7%, a carbon film was coated from C₂H₂ under the same conditions as in Example 1 but keeping the tension on the optical fiber at 5 MPa and then the resin was coated to produce a coated optical fiber (Nos. A, B and C).

The properties of the optical fibers were measured as in Example 1. The results are shown in Table 2. In particular, the optical fiber No. C of the present invention had very good properties such as the initial strength of 5.5 kg and the dynamic fatigue parameter of larger than 100.

TABLE 2

| | | | Properties | | |
|---|---|---|---|---|---|
| Fiber No. | Core glass | Cladding glass | Initial strength (kg) | Adhesivity of carbon film | Dynamic fatigue parameter |
| A | GeO₂—SiO₂ (GeO₂: 12 wt %) | SiO₂ | 4.0 | B | >50 |
| B | GeO₂—SiO₂ (GeO₂: 7 wt %) | F—SiO₂ (F: 1 wt %) | 4.8 | A | >50 |
| C | SiO₂ | F—SiO₂ (F: 2.3 wt %) | 5.5 | A | >100 |

EXAMPLE 3

Around a single mode optical fiber having a core diameter of 10 μm and a cladding diameter of 125 μm which was fabricated by the VAD method from the combination of the core glass of GeO₂-doped SiO₂ (GeO₂ content 5% by weight) and the cladding glass of SiO₂ which achieved the refractive index difference of 0.3%, a carbon film was coated from C₂H₂ under the same conditions as in Example 1 but keeping the tension on the optical fiber at 20 MPa and then the resin was coated to produce a coated optical fiber (No. D for comparison).

Around the optical fiber of the above, a second cladding was formed from F-doped $SiO_2$ (F content: 3% by weight) by the plasma outer deposition method to a thickness of 2 to 3 μm. Then, the carbon film and the resin were coated in the same manner as above.

The properties of the optical fiber Nos. D and E were measured as in Example 1. The results are shown in Table 3.

TABLE 3

| Fiber No. | Core glass | First cladding glass | Second cladding glass | Initial strength (kg) | Adhesivity of carbon film | Dynamic fatigue parameter |
| --- | --- | --- | --- | --- | --- | --- |
| D | $GeO_2$—$SiO_2$ ($GeO_2$: 5 wt %) | $SiO_2$ | — | 4.1 | B | >50 |
| E | $GeO_2$—$SiO_2$ ($GeO_2$: 5 wt %) | $SiO_2$ | F—$SiO_2$ (F: 1 wt %) | 5.5 | A | >50 |

EXAMPLE 4

Around a single mode optical fiber having a core diameter of 10 μm and a cladding diameter of 125 μm which was fabricated by the VAD method from the combination of glasses shown in Table 4 which achieved the refractive index difference of 0.3%, a carbon film was coated from $C_2H_4$ under the same conditions as in Example 1 but keeping the tension on the optical fiber at the value shown in Table 4 and then the resin was coated to produce a coated optical fiber (Nos. F, G and H).

The properties of the optical fibers were measured as in Example 1. The results are shown in Table 4.

As understood from the results of Table 4, the optical fibers coated with the carbon film under tension of less than 20 MPa had very good properties, while the optical fiber coated with the carbon film under tension of 25 MPa had poor properties such as the initial strength of 4 kg.

TABLE 4

| Fiber No. | Core glass | Raw material | Tension during drawing (MPa) | Initial strength (kg) | Adhesivity of carbon film | Dynamic fatigue parameter |
| --- | --- | --- | --- | --- | --- | --- |
| F | F—$SiO_2$ (F: 1 wt %) | $C_2H_4$ | 5 | 5.0 | A | >50 |
| G | ↑ | ↑ | 15 | 5.0 | A | >50 |
| H | ↑ | ↑ | 25 | 4.0 | C | 20 |

What is claimed is:

1. A hermetically coated optical fiber which comprises
   a core made of glass,
   a cladding made of quartz glass surrounding the core the outermost layer of which cladding contains fluorine, and
   a carbon layer surrounding the fluorine-containing outermost cladding layer, the carbon layer formed of unsaturated hydrocarbons selected from the group consisting of ethylene, acetylene and benzene, carbons from said unsaturated hydrocarbons forming covalent C-Si bonds with the fluorine-containing outermost cladding layer.

2. The hermetically coated optical fiber, according to claim 1 wherein the core is made of $SiO_2$.

3. Their hermetically coated optical fiber, according to claim 1 wherein the cladding comprises at least two layers and the outermost layer contains fluorine.

* * * * *